(12) United States Patent
Tang

(10) Patent No.: US 11,303,607 B2
(45) Date of Patent: Apr. 12, 2022

(54) INFORMATION TRANSMISSION METHOD, TERMINAL DEVICE, AND NETWORK DEVICE FOR ALLOCATING A RESOURCE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 57 days.

(21) Appl. No.: 16/879,221

(22) Filed: May 20, 2020

(65) Prior Publication Data

US 2020/0280533 A1    Sep. 3, 2020

Related U.S. Application Data

(63) Continuation of application No. PCT/CN2018/080559, filed on Mar. 26, 2018.

(30) Foreign Application Priority Data

Nov. 24, 2017  (WO) ............... PCT/CN2017/112943

(51) Int. Cl.
*G06F 15/16* (2006.01)
*H04L 61/4541* (2022.01)
(Continued)

(52) U.S. Cl.
CPC .......... *H04L 61/1541* (2013.01); *H04L 67/16* (2013.01); *H04L 61/6022* (2013.01); *H04W 4/46* (2018.02)

(58) Field of Classification Search
CPC .............................. H04L 61/1541; H04L 67/16
(Continued)

(56) References Cited

U.S. PATENT DOCUMENTS

2009/0234717 A1    9/2009  Wiggins et al.
2017/0188391 A1*   6/2017  Rajagopal ......... H04W 28/0284
(Continued)

FOREIGN PATENT DOCUMENTS

CN         101631061 A    1/2010
CN         106506633 A    3/2017
(Continued)

OTHER PUBLICATIONS

Ericsson, "Clarification to Mapping Between Service Types and V2X Frequencies", 3GPP Draft; R2-1713510, Nov. 17, 2017, XP051372209 (Year: 2017).*
(Continued)

*Primary Examiner* — Hee Soo Kim

(57) ABSTRACT

Provided are an information transmission method, a resource allocation method, a terminal device, and a network device. In embodiments of the present invention, a terminal device converts at least one first carrier corresponding to a first address into at least one first carrier corresponding to a first index, converts at least one second carrier corresponding to a second address into at least one second carrier corresponding to a second index, and report the at least one first carrier corresponding to the first index and the at least one second carrier corresponding to the second index to a network device, so that the network device can determine at least one first carrier corresponding to a first address according to the first index and at least one second carrier corresponding to a second address according to the second index.

19 Claims, 4 Drawing Sheets

(51) Int. Cl.
  *H04L 67/51* (2022.01)
  *H04W 4/46* (2018.01)
  *H04L 101/622* (2022.01)
(58) Field of Classification Search
  USPC ............................................. 709/245
  See application file for complete search history.

(56) References Cited

U.S. PATENT DOCUMENTS

2017/0331670 A1* 11/2017 Parkvall ............... H04J 11/0079
2018/0146388 A1* 5/2018 Lee ....................... H04W 52/14

FOREIGN PATENT DOCUMENTS

| CN | 106603435 | A | 4/2017 |
|----|-----------|---|--------|
| CN | 107113651 | A | 8/2017 |
| EP | 3328140 | A1 | 5/2018 |
| WO | 2011139069 | A2 | 11/2011 |
| WO | 2016106639 | A1 | 7/2016 |
| WO | 2016182292 | A1 | 11/2016 |
| WO | 2017012467 | A1 | 1/2017 |
| WO | 2017035751 | A1 | 3/2017 |

OTHER PUBLICATIONS

Spreadtrum Communications, "Discussion on resource allocation conflict for sidelink one-to-one communication", 3GPP Draft; R2-163408, May 22, 2016, XP05110930 (Year: 2016).*

International Search Report (ISR) dated Aug. 15, 2018 for Application No. PCT/CN2018/080559.

International Search Report (ISR) dated Aug. 10, 2018 for Application No. PCT/CN2017/112943.

The EESR of corresponding European application No. 18880608.7, dated Aug. 28, 2020.

Ericsson:"Clarification to Mapping Between Service Types and V2X Frequencies", 3GPP Draft; R2-1713510. 3rd Generation Partnership Project (3GPP), Mobile Competence Centre: 650, Route Des Lucioles; F-06921 Sophia-Antipolis Cedex; France, vol. RAN WG2, No. Reno. Nevada, USA; Nov. 27, 2017-Dec. 1, 2017 Nov. 17, 2017(Nov. 17, 2017), XP051372209.

Spreadtrum Communiations:"Discussion on resource allocation conflict for sidelink one-to-one communication", 3GPP Draft; R2-163408 Discussion on Resource Allocation Conflict for Sidelink One-to-One Communication, 3rd Generation Partnership Project (3GPP), Mobile Competence Centre; 650, Route Des Lucioles; vol. RAN WG2, No. Nanjing; May 23, 2016-May 27, 2016 May 22, 2016(May 22, 2016), XP051104930.

Ericsson "Clarification to Mapping Between Service Types and V2X Frequencies". 3GPP Draft; 36300_CR1067_(REL-14)_R2-1711858—Clarification to Mapping Between Service Types and V2X Frequencies_V2, 3rd Generation Partnership Project (3GPP), Mobile Competence Centre; 650, Route D, vol. RAN WG2, No. Prague, Czech Republic; Oct. 9, 2017-Oct. 13, 2017 Oct. 13, 2017(Oct. 13, 2017), XP051355896.

Ericsson et al:"Clarification to mapping between service types and V2X frequencies", S2-177807_7039_23285_Clarification to Mapping Between Service Types and V2X Frequencies, 3rd Generation Partnership Project (3GPP), Mobile Competence Centre; 650, Route Des Lucioles: F-0, vol. SA WG2, No. Ljubljana, Slovenia; Oct. 23, 2017-Oct. 27, 2017 Oct. 30, 2017(Oct. 30, 2017), XP051360443.

"3rd Generation Partnership Project; Technical Specification Group Services and System Aspects; Architecture enhancements for V2X services (Release 14)", 3GPP Standard; Technical Specification; 3GPP TS 23.285, 3rd Generation Partnership Project (3GPP), Moble Competence Centre; 650, Route Des Lucioles; F-06921 Sophia-Antipolis Cedex; France. vol. SA WG2, No. V14.4.0 Sep. 18, 2017(Sep. 18, 2017), pp. 1-35. XP051336972.

3rd Generation Partnership Project; Technical Specification Group Services and System Aspects; Study on architecture enhancements for LTE support of V2X services(Release 14), 3GPP Standard; Technical Report; 3GPP TR 23.785, 3rd Generation Partnership Project (3GPP), Mobile Competence Centre; 650, Route Des Lucioles; F-06921 Sophia-Antipolis Cedex; France, vol. SA WG2, No. V14.0.0, Sep. 26, 2016(Sep. 26, 2016), pp. 1-52, XP051295333.

Samsung:"Sidelink BSR for Unicast", 3GPP Draft; R2-154064, 3rd Generation Partnership Project (3GPP), Mobile Competence Centre; 650, Route Des Lucioles; F-06921 Sophia-Antipolis Cedex; France, vol. RAN WG2, No. Malmo, Sweden; Oct. 5, 2015-Oct. 9, 2015 Oct. 4, 2015(Oct. 4, 2015), XP051004676.

Oppo:"Discussion on eV2X mode-3", 3GPP Draft; R2-1804360—Discussion on EV2X Mode-3, 3rd Generation Partnership Project (3GPP), Mobile Competence Centre; 650, Route Des Lucioles; F-06921 Sophia-Antipolis Cedex; France, vol. RAN WG2, No. Sanya, China; Apr. 16, 2018-Apr. 20, 2018 Apr. 14, 2018(Apr. 14, 2018), XP051428108.

Oppo et al:"L2 destination address collision handling in eV2x", 3GPP Draft: R2-1801857—L2 Desination Address Collision Handling in EV2X, 3rd Generation Partnership Project (3GPP), Mobile Competence Centre; 650, Route Des Lucioles; F-06921 Sophia-Antipolis CE, vol. RAN WG2, No. Athens, Greece; Feb. 26, 2018-Mar. 2, 2018 Feb. 15, 2018(Feb. 15, 2018), XP051399368.

* cited by examiner

INFORMATION TRANSMISSION METHOD, TERMINAL DEVICE, AND NETWORK DEVICE FOR ALLOCATING A RESOURCE

CROSS-REFERENCE TO RELATED APPLICATION

This application is a continuation of International Application No. PCT/CN2018/080559, filed on Mar. 26, 2018, which claims priority to International Application No. PCT/CN2017/112943, entitled "INFORMATION TRANSMISSION METHOD, RESOURCE ALLOCATION METHOD, TERMINAL DEVICE, AND NETWORK DEVICE", filed on Nov. 24, 2017, each of which are incorporated herein by reference in their entireties.

TECHNICAL FIELD

Embodiments of the present disclosure relates to the field of communication and, in particular, to an information transmission method, a resource allocation method, a terminal device, and a network device.

BACKGROUND

An internet of vehicles system is a sidelink (SL) transmission technology based on Long Term Evaluation Vehicle to Vehicle (LTE V2V). Unlike the traditional LTE system, where communication data is received or sent by a base station, the internet of vehicles system uses a terminal-to-terminal direct communication method. Therefore, the internet of vehicles system has higher spectrum efficiency and lower transmission delay.

The 3rd Generation Partnership Project (3GPP) Rel-14 standardizes the Vehicle to Everything (V2X) in the internet of vehicles technology, and defines two transmission modes: Mode 3 and Mode 4. Specifically, in Mode 3, as shown in FIG. 1, a transmission resource of a vehicle terminal (a vehicle terminal 121 and a vehicle terminal 122) is allocated by a base station 110, and the vehicle terminal 121, 122 sends data on a sidelink according to the resource allocated by the base station 110. The base station 110 may allocate a resource to the terminal for single transmission, and may also allocate a resource to the terminal for semi-persistent transmission. In Mode 4, as shown in FIG. 2, a vehicle terminal (a vehicle terminal 131 and a vehicle terminal 132) adopts a sensing plus reservation transmission method. Specifically, the vehicle terminal 131, 132 acquires a set of available transmission resources by sensing in a resource pool, and the terminal randomly selects one resource from the set for data transmission.

However, in the prior art, in Mode 3, a terminal device may support multiple services, each service having a layer 2 address, and the terminal device reports to a network device that each layer 2 address corresponds to at least one carrier (for example, if there are a total of 8 carriers, service 1 corresponds to carrier 1, carrier 2, and carrier 3, and service 2 corresponds to carrier 2, carrier 3, and carrier 4). In addition, the terminal device also reports to the network device data amounts corresponding to different layer 2 addresses. The network device allocates a resource for D2D transmission to the terminal device according to the at least one carrier and data amount corresponding to the layer 2 address reported by the terminal device.

However, multiple different services may be allocated with the same address. In this case, the network device cannot clearly distinguish among these addresses, and thus cannot perform resource allocation for the terminal device.

SUMMARY

Provided are an information transmission method, a resource allocation method, a terminal device, and a network device, which enable a network device to allocate a resource to a terminal device accurately.

In a first aspect, an information transmission method is provided, including:

obtaining, by a terminal device, first mapping relationship information and second mapping relationship information, where the first mapping relationship information includes a mapping relationship between a first service and a first address, and the second mapping relationship information includes a mapping relationship between the first service and at least one first carrier;

determining, by the terminal device, a first index corresponding to the first service:

determining, by the terminal device, third mapping relationship information according to the first mapping relationship information, the second mapping relationship information and the first index, where the third mapping relationship information includes a mapping relationship between the first index and the at least one first carrier; and sending, by the terminal device, the third mapping relationship information to a network device.

In the embodiment of the present disclosure, the terminal device converts the address of the service. Specifically, at least one first carrier corresponding to the first address is converted into at least one first carrier corresponding to the first index. The converted mapping relationship is reported to the network device, so that the network device can determine at least one first carrier corresponding to the first address according to the first index.

In some possible implementations, the method further includes:

obtaining, by the terminal device, a first data amount of the first service; determining, by the terminal device, fourth mapping relationship information according to the first mapping relationship information, the second mapping relationship information and the first index, where the fourth mapping relationship information includes a mapping relationship between the first index and the first data amount; and sending, by the terminal device, the fourth mapping relationship information to the network device.

In some possible implementations, the first address and the first index are different.

In some possible implementations, the first mapping relationship information further includes a mapping relationship between a second service and a second address, and the second mapping relationship information further includes a mapping relationship between the second service and at least one second carrier; and the method further includes:

determining, by the terminal device, a second index corresponding to the second service, where the first index is different from the second index; determining, by the terminal device, the third mapping relationship information according to the first mapping relationship information, the second mapping relationship information and the second index, where the third mapping relationship information further includes a mapping relationship between the second index and the at least one second carrier.

In some possible implementations, the first address and the second address are different.

In some possible implementations, the first address and the second address are the same.

In some possible implementations, the second address and the second index are different.

In some possible implementations, the second address and the second index are the same.

In some possible implementations, the determining, by the terminal device, the first index corresponding to the first address includes:

generating, by the terminal device, an address list, where the address list includes the first address; and determining, by the terminal device, an order of the first address in the address list as the first index.

In some possible implementations, the address list further includes the second address, and an order of the second address in the address list is the second index corresponding to the second service.

In some possible implementations, the method further includes:

sending, by the terminal device, the address list to the network device.

In some possible implementations, the determining, by the terminal device, the first index corresponding to the first service includes:

determining, by the terminal device, an index corresponding to the first address as the first index.

In some possible implementations, the method further includes:

generating, by the terminal device, fifth mapping relationship information, where the fifth mapping relationship information includes a mapping relationship between the first address and the first index; and sending, by the terminal device, the fifth mapping relationship information to the network device.

In some possible implementations, the first index is a third address of the first service determined by an access layer of the terminal device.

In some possible implementations, the method further includes:

sending, by the terminal device, the first index to the network device.

In a second aspect, a resource allocation method is provided, including:

determining, by a network device, a first index:

receiving, by the network device, third mapping relationship information sent by a terminal device, where the third mapping relationship information includes a mapping relationship between the first index and at least one first carrier;

determining, by the network device, the at least one first carrier corresponding to the first index according to the third mapping relationship information and the first index; and allocating, by the network device, a resource to the terminal device according to the at least one first carrier.

In some possible implementations, the allocating, by the network device, the resource to the terminal device according to the at least one first carrier includes:

obtaining, by the network device, fourth mapping relationship information, where the fourth mapping relationship information includes a mapping relationship between the first index and a first data amount; and allocating, by the network device, the resource to the terminal device according to the at least one first carrier and the first data amount.

In some possible implementations, the first address and the first index are different.

In some possible implementations, the third mapping relationship information further includes a mapping relationship between a second index and at least one second carrier, and the first index and the second index are different.

In some possible implementations, the first address and a second address are different.

In some possible implementations, the first address and a second address are the same.

In some possible implementations, a second address and the second index are different.

In some possible implementations, a second address and the second index are the same.

In some possible implementations, the determining, by the network device, the first index includes:

receiving, by the network device, an address list sent by the terminal device; and determining, by the network device, an order of the first address in the address list as the first index.

In some possible implementations, the address list further includes a second address, and an order of the second address in the address list is a second index corresponding to the second address.

In some possible implementations, the determining, by the network device, the first index includes:

receiving, by the network device, the first index sent by the terminal device.

In some possible implementations, the first index is a third address determined by an access layer of the terminal device.

In some possible implementations, the method further includes:

receiving, by the network device, fifth mapping relationship information sent by the terminal device, where the fifth mapping relationship information includes a mapping relationship between the first address and the first index; so that the network device determines the first address according to the fifth mapping relationship information and the first index.

In a third aspect, a terminal device is provided, including:

a processing unit, configured to:

obtain first mapping relationship information and second mapping relationship information, where the first mapping relationship information includes a mapping relationship between a first service and a first address, and the second mapping relationship information includes a mapping relationship between the first service and at least one first carrier;

determine a first index corresponding to the first service; and determine third mapping relationship information according to the first mapping relationship information, the second mapping relationship information and the first index, where the third mapping relationship information includes a mapping relationship between the first index and the at least one first carrier; and a transceiving unit, configured to send the third mapping relationship information to a network device.

In a fourth aspect, a terminal device is provided, including:

a processor, configured to:

obtain first mapping relationship information and second mapping relationship information, where the first mapping relationship information includes a mapping relationship between a first service and a first address, and the second mapping relationship information includes a mapping relationship between the first service and at least one first carrier;

determine a first index corresponding to the first service; and determine third mapping relationship information according to the first mapping relationship information, the second mapping relationship information and the first index, where the third mapping relationship information includes a mapping relationship between the first index and the at least one first carrier; and a transceiver, configured to send the third mapping relationship information to a network device.

In a fifth aspect, a network device is provided, including:
a processing unit, configured to determine a first index;
a transceiving unit, configured to receive third mapping relationship information sent by a terminal device, where the third mapping relationship information includes a mapping relationship between the first index and at least one first carrier;

where the processing unit is further configured to:
determine the at least one first carrier corresponding to the first index according to the third mapping relationship information and the first index; and
allocate a resource to the terminal device according to the at least one first carrier.

In a sixth aspect, a network device is provided, including:
a processor, configured to determine a first index;
a transceiver, configured to receive third mapping relationship information sent by a terminal device, where the third mapping relationship information includes a mapping relationship between the first index and at least one first carrier:

where the processor is further configured to:
determine the at least one first carrier corresponding to the first index according to the third mapping relationship information and the first index; and
allocate a resource to the terminal device according to the at least one first carrier.

In a seventh aspect, an information transmission method is provided, including:
obtaining, by a terminal device, a mapping relationship between at least one service and at least one carrier;
obtaining, by the terminal device, a data amount of the at least one service;
determining, by the terminal device, a data amount on each carrier of the at least one carrier, according to the mapping relationship between the at least one service and the at least one carrier and the data amount of the at least one service; and
sending, by the terminal device, indication information to the network device, where the indication information is used to indicate the data amount on each carrier.

In an eighth aspect, an information transmission method is provided, including:
receiving, by a network device, indication information sent by a terminal device, where the indication information is used to indicate a data amount on each carrier; and
allocating, by the network device, a resource to the terminal device according to the indication information.

In a ninth aspect, a terminal device is provided, including:
a transceiving unit, configured to:
obtain a mapping relationship between at least one service and at least one carrier;
and
obtain a data amount of the at least one service; and
a processing unit, configured to determine a data amount on each carrier of the at least one carrier, according to the mapping relationship between the at least one service and the at least one carrier and the data amount of the at least one service:

where the transceiving unit is further configured to send indication information to a network device, where the indication information is used to indicate the data amount on each carrier.

In a tenth aspect, a terminal device is provided, including:
a transceiver, configured to:
obtain a mapping relationship between at least one service and at least one carrier; and
obtain a data amount of the at least one service; and
a processor, configured to determine a data amount on each carrier of the at least one carrier, according to the mapping relationship between the at least one service and the at least one carrier and the data amount of the at least one service:

where the transceiver is further configured to send indication information to a network device, where the indication information is used to indicate the data amount on each carrier.

In an eleventh aspect, a network device is provided, including:
a transceiving unit, configured to receive indication information sent by a terminal device, where the indication information is used to indicate a data amount on each carrier; and
a processing unit, configured to allocate a resource to the terminal device according to the indication information.

In a twelfth aspect, a network device is provided, including:
a transceiver, configured to receive indication information sent by a terminal device, where the indication information is used to indicate a data amount on each carrier; and
a processor, configured to allocate a resource to the terminal device according to the indication information.

In a thirteenth aspect, an information transmission method is provided, the method including:
obtaining, by a terminal device, first mapping relationship information and second mapping relationship information, where the first mapping relationship information includes a mapping relationship between a first service and a first address, and the second mapping relationship information includes a mapping relationship between the first service and at least one first carrier;
determining, by the terminal device, at least one first index corresponding to the first service;
obtaining, by the terminal device, a first data amount of the first service;
determining, by the terminal device, fourth mapping relationship information according to the first mapping relationship information, the second mapping relationship information and the at least one first index, where the fourth mapping relationship information includes a mapping relationship between the at least one first index and the first data amount; and
sending, by the terminal device, the fourth mapping relationship information to a network device.

In a fourteenth aspect, a resource allocation method is provided, the method including:
determining, by a network device, at least one first index:
receiving, by the network device, fourth mapping relationship information sent by a terminal device, where the fourth mapping relationship information includes a mapping relationship between the at least one first index and a first data amount; and
allocating, by the network device, a resource to the terminal device according to the first data amount.

In a fifteenth aspect, a terminal device is provided, the terminal device including:

a processing unit, configured to:

obtain first mapping relationship information and second mapping relationship information, where the first mapping relationship information includes a mapping relationship between a first service and a first address, and the second mapping relationship information includes a mapping relationship between the first service and at least one first carrier;

determine at least one first index corresponding to the first service;

obtain a first data amount of the first service; and determine fourth mapping relationship information according to the first mapping relationship information, the second mapping relationship information and the at least one first index, where the fourth mapping relationship information includes a mapping relationship between the at least one first index and the first data amount; and a transceiving unit, configured to send the fourth mapping relationship information to a network device.

In a sixteenth aspect, a network device is provided, the network device including:

a processor, configured to determine at least one first index; and a transceiver, configured to receive fourth mapping relationship information sent by a terminal device, where the fourth mapping relationship information includes a mapping relationship between the at least one first index and a first data amount;

where the processor is further configured to allocate a resource to the terminal device according to the first data amount.

In a seventeenth aspect, a terminal device is provided, including:

a processor, configured to:

obtain first mapping relationship information and second mapping relationship information, where the first mapping relationship information includes a mapping relationship between a first service and a first address, and the second mapping relationship information includes a mapping relationship between the first service and at least one first carrier;

determine at least one first index corresponding to the first service;

obtain a first data amount of the first service; and determine fourth mapping relationship information according to the first mapping relationship information, the second mapping relationship information and the at least one first index, where the fourth mapping relationship information includes a mapping relationship between the at least one first index and the first data amount; and a transceiver, configured to send the fourth mapping relationship information to a network device.

In an eighteenth aspect, a network device is provided, including:

a processor, configured to determine at least one first index; and a transceiver, configured to receive fourth mapping relationship information sent by a terminal device, where the fourth mapping relationship information includes a mapping relationship between the at least one first index and a first data amount;

where the processor is further configured to allocate a resource to the terminal device according to the first data amount.

In a nineteenth aspect, a computer-readable medium is provided for storing a computer program, where the computer program includes instructions for executing the above method embodiments.

In a twentieth aspect, a computer chip is provided, including: an input interface, an output interface, at least one processor and a memory, where the processor is configured to execute codes in the memory, and, when the codes are executed, the processor implements various processes executed by the network device in the above method embodiments.

In a twenty-first aspect, a computer chip is provided, including: an input interface, an output interface, at least one processor and a memory, where the processor is configured to execute codes in the memory, and, when the codes are executed, the processor implements various processes executed by the terminal device in the above method embodiments.

In a twenty-second aspect, a communication system is provided, including the above network device and terminal device.

DESCRIPTION OF EMBODIMENTS

Technical solutions in embodiments of the present disclosure will be described below with reference to the drawings.

Figure 1:
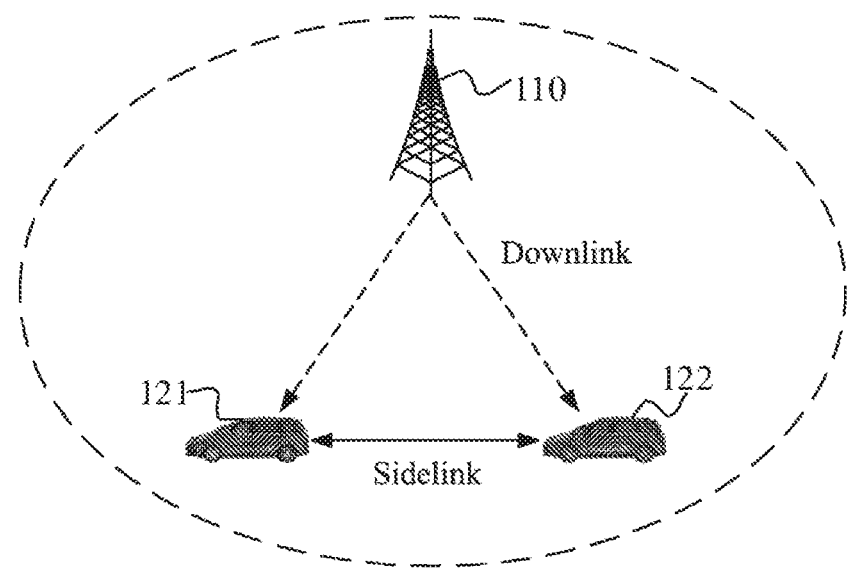
FIG. 1 is a schematic frame diagram of a transmission mode according to the prior art.
Figure 2:
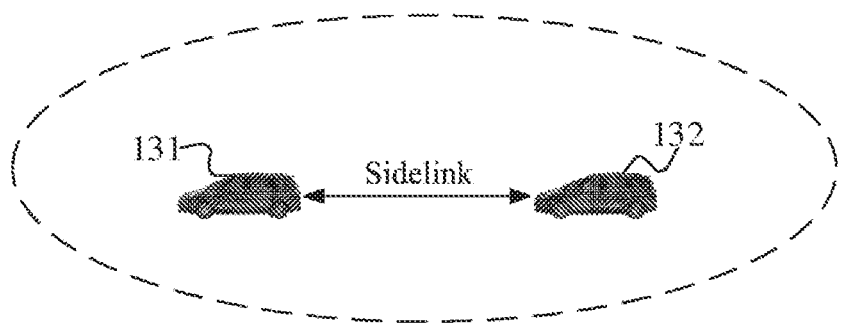
FIG. 2 is a schematic frame diagram of another transmission mode according to the prior art.

The embodiments of the present disclosure may be applied to any terminal device-to-terminal device communication framework, for example, Vehicle to Vehicle (V2V), Vehicle to Everything (V2X), Device to Device (D2D), and the like. That is, the vehicle terminal-to-vehicle terminal system framework shown in FIG. 2 is also applicable to the embodiments of the present disclosure, and the embodiments of the present disclosure are not limited thereto.

The terminal device in the embodiments of the present disclosure may be any device or apparatus configured with a physical layer and a media access control layer. The terminal device may also be referred to as an access terminal, for example, User Equipment (UE), user unit, user station, mobile station, mobile platform, remote station, remote terminal, mobile device, user terminal, terminal, wireless communication device, user agent, or user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device, or other linear processing devices connected to a wireless modem, in-vehicle devices, wearable devices, and the like. The embodiments of the present disclosure are described by taking a vehicle terminal as an example, but it is not limited thereto.

In the embodiments of the present disclosure, when the terminal device senses a resource pool, a short transmission time interval (short TTI) resource pool is introduced on the basis of a traditional long transmission time interval (long TTI) resource pool. That is, in the sensing method of the embodiments of the present disclosure, when the terminal device needs to select a resource, if there are both a short TTI resource pool and a long TTI resource pool, the terminal device may selectively sense the resource pools.

However, in the prior art, in Mode 3, a terminal device may support multiple services, each service having a layer 2 address, and the terminal device reports to a network device that each layer 2 address corresponds to at least one carrier (for example, if there are a total of 8 carriers, service 1 corresponds to carrier 1, carrier 2, and carrier 3, and service 2 corresponds to carrier 2, carrier 3, and carrier 4). In addition, the terminal device also reports to the network device a data amount corresponding to different layer 2 addresses. The network device allocates a resource for D2D transmission to the terminal device according to the at least one carrier and data amount corresponding to the layer 2 address reported by the terminal device.

However, multiple different services may be allocated with the same address. In this case, the network device cannot clearly distinguish among these addresses, and thus cannot perform resource allocation for the terminal device.

In order to solve the above problem, an embodiment of the present disclosure proposes an information transmission method, which enables the network device to allocate a resource to the terminal device accurately.

Figure 3:
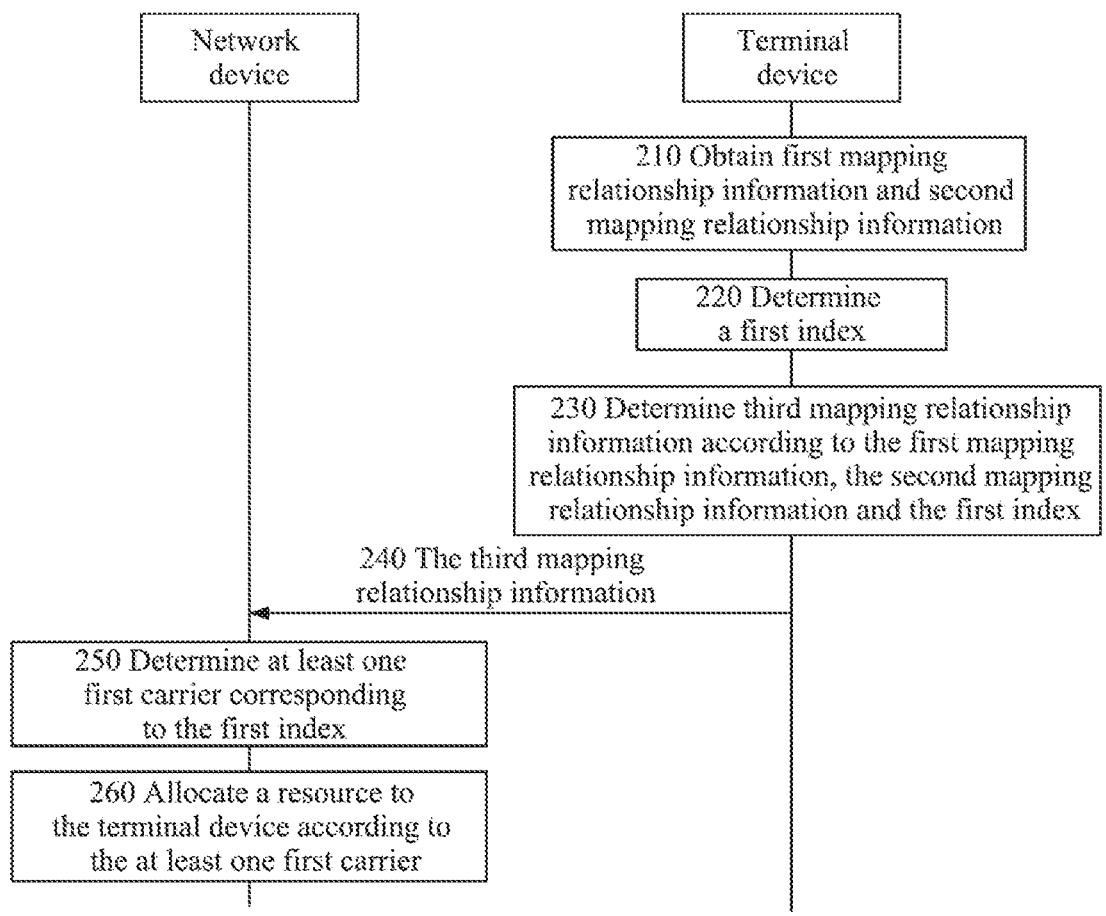
FIG. 3 is a schematic flowchart of an interaction method of a terminal device and a network device according to an embodiment of the present disclosure.

Specifically, as shown in FIG. 3, the method includes:

In step 210, a terminal device obtains first mapping relationship information and second mapping relationship information.

In step 220, the terminal device determines a first index.

In step 230, the terminal device determines third mapping relationship information according to the first mapping relationship information, the second mapping relationship information and the first index.

In step 240, the terminal device sends the third mapping relationship information to a network device.

In step 250, the network device determines at least one first carrier corresponding to the first index.

In step 260, the network device allocates a resource to the terminal device according to the at least one first carrier.

Here, the first mapping relationship information includes a mapping relationship between a first service and a first address, and the second mapping relationship information includes a mapping relationship between the first service and the at least one first carrier.

Specifically, the terminal device determines the first index corresponding to the first service; the terminal device determines the third mapping relationship information according to the first mapping relationship information, the second mapping relationship information and the first index, where the third mapping relationship information includes a mapping relationship between the first index and the at least one first carrier; and the terminal device sends the third mapping relationship information to the network device.

Therefore, after the network device determines the first index, the network device receives the third mapping relationship information sent by the terminal device, where the third mapping relationship information includes the mapping relationship between the first index and the at least one first carrier; the network device determines the at least one first carrier corresponding to the first index according to the third mapping relationship information and the first index; and the network device allocates the resource to the terminal device according to the at least one first carrier.

It can be seen that, in the embodiment of the present disclosure, the terminal device converts the address of the service. Specifically, at least one first carrier corresponding to the first address is converted into at least one first carrier corresponding to the first index. The converted mapping relationship is reported to the network device, so that the network device can determine at least one first carrier corresponding to the first address according to the first index.

Further, the terminal device may also obtain a first data amount of the first service; the terminal device determines fourth mapping relationship information according to the first mapping relationship information, the second mapping relationship information and the first index, where the fourth mapping relationship information includes a mapping relationship between the first index and the first data amount; and the terminal device sends the fourth mapping relationship information to the network device.

Therefore, after obtaining the fourth mapping relationship information, the network device may allocate the resource to the terminal device according to the at least one first carrier and the first data amount.

It should be understood that, in the embodiment of the present disclosure, the first address and the first index may be different or the same, which is not specifically limited in the embodiment of the present disclosure. Specifically, the first address and the first index being the same may be interpreted as that the terminal device directly determines the first address as the first index. The first address and the first index being different may be interpreted as that the first index determined by the terminal device is different from the first address.

In an embodiment, the first mapping relationship information further includes a mapping relationship between a second service and a second address, and the second mapping relationship information further includes a mapping relationship between the second service and at least one second carrier.

In the embodiment of the present disclosure, the terminal device determines a second index corresponding to the second service, where the first index and the second index are different; the terminal device determines the third mapping relationship information according to the first mapping relationship information, the second mapping relationship information and the second index, where the third mapping relationship information further includes a mapping relationship between the second index and the at least one second carrier.

It can be seen that, in the embodiment of the present disclosure, the first mapping relationship and the second mapping relationship are converted into the third mapping relationship and the fourth mapping relationship, and are reported to the network device. Therefore, when the first address and the second address are the same (that is, when the addresses conflict), the terminal device may make the conflicted first address and the second address correspond to different indexes, which can prevent the network device from being unable to clearly distinguish among the conflicted addresses, thereby allocating the resource to the terminal device accurately.

It should be understood that the method in the embodiment of the present disclosure may only be used for conflicted addresses, that is, when the first address and the second address are the same. However, the embodiment of the present disclosure is not limited thereto.

For example, the method of the embodiment of the present disclosure may be used for addresses that do not conflict, that is, when the first address and the second address are different. In this case, the terminal device converts the reported mapping relationship from the above first mapping relationship to the above third mapping relationship and the fourth mapping relationship regardless of whether there is a conflict in the addresses of the services.

It should also be understood that, in the embodiment of the present disclosure, the second address and the second index may be the same or different, that is, the terminal device may directly determine the second address as the second index. The second index determined by the terminal device may also be different from the second address.

In other words, in the embodiment of the present disclosure, the terminal device needs to determine the second index.

It should be noted that the terminal device may determine the first index and the second index, and the terminal device may also only determine the first index. That is, for the first service, the terminal device may convert the first mapping relationship and the second mapping relationship into the third mapping relationship and the fourth mapping relationship and report the third mapping relationship and the fourth mapping relationship to the network device. However, for the second service, the terminal device may directly report the first mapping relationship and the second mapping relationship to the network device.

In the following, how the terminal device reports the information after the terminal device reports the foregoing third mapping relationship information and the fourth mapping relationship information to the network device in the embodiment of the present disclosure is exemplarily described.

In an embodiment, the terminal device generates an address list, where the address list includes the first address; and the terminal device determines an order of the first address in the address list as the first index corresponding to the first address.

Further, the address list may further include the second address mentioned above, and an order of the second address in the address list is the second index corresponding to the second service.

In this case, the terminal device may send the address list to the network device. The network device receives the address list sent by the terminal device; and determines the order of the first address in the address list as the first index. Further, the resource is allocated to the terminal device according to the first index, the third mapping relationship information and fourth mapping relationship information.

It should be noted that, in the embodiment of the present disclosure, the terminal device may send to the network device in the form of the address list, or may sequentially send to the network device in the order of the address list, which is not specifically limited in the embodiment of the present disclosure.

In another embodiment, the terminal device may determine an index corresponding to the first address as the first index. In other words, the terminal device may directly generate fifth mapping relationship information, where the fifth mapping relationship information includes a mapping relationship between the first address and the first index. Therefore, after receiving the first index sent by the terminal device, the network device may directly determine the at least one first carrier corresponding to the first index according to the first index and the third mapping relationship, and may also directly determine the first data amount corresponding to the first index according to the first index and the fourth mapping relationship, thereby allocating the resource to the terminal device according to the at least one first carrier and the first data amount.

In the embodiment of the present disclosure, the fifth mapping relationship information is further reported to the network device. Therefore, when the network device needs to know a specific address, it may directly determine the first address corresponding to the first index according to the fifth mapping relationship information and the first index.

In another embodiment, the first index is a third address of the first service determined by an access layer of the terminal device.

In this case, the terminal device may directly send the first index to the network device.

The network device receives the first index sent by the terminal device, and allocates the resource to the terminal device based on the first index, the third mapping relationship information and fourth mapping relationship information.

It should be understood that the foregoing reporting of the third mapping relationship and the fourth mapping relationship by the terminal device to the network device is merely an example. In other embodiments, the terminal device may also report the third mapping relationship or the fourth mapping relationship to the network device, and achieve the purpose of resource allocation to the terminal device by the network device in combination with other reported information.

The following uses the terminal device reporting the fourth mapping relationship to the network device as an example for description:

In an embodiment, the terminal device obtains first mapping relationship information and second mapping relationship information, where the first mapping relationship information includes a mapping relationship between a first service and a first address, and the second mapping relationship information includes a mapping relationship between the first service and at least one first carrier; the terminal device determines at least one first index corresponding to the first service; the terminal device obtains a first data amount of the first service; the terminal device determine fourth mapping relationship information according to the first mapping relationship information, the second mapping relationship information and the at least one first index, where the fourth mapping relationship information includes a mapping relationship between the at least one first index and the first data amount; and the terminal device sends the fourth mapping relationship information to the network device. Further, the terminal device determines a first list according to the first mapping relationship information and the second mapping relationship information, where the first list includes the at least one first carrier corresponding to the first address; and the terminal device sends the first list to the network device. It can be seen that, in the embodiment of the present disclosure, the terminal device converts the address of the service. Specifically, the first mapping relationship and the second mapping relationship are converted into the fourth mapping relationship and the first list to report to the network device, so that the network device can determine, according to the at least one first index, the first data amount corresponding to the at least one first index and the at least one first carrier corresponding to the first address.

It should be understood that, in the embodiment of the present disclosure, the first address and the at least one first index may be different or the same, which is not specifically limited in the embodiment of the present disclosure. Specifically, the first address and the at least one first index being the same may be interpreted as that when the at least one first index includes only one first index, the terminal device directly determines the first address as the at least one first index. The first address and the at least one first index being different may be interpreted as that each first index of the at least one first index determined by the terminal device is different from the first address.

In an embodiment, the first mapping relationship information further includes a mapping relationship between a second service and a second address, and the second mapping relationship information further includes a mapping relationship between the second service and at least one second carrier. In the embodiment of the present disclosure, the terminal device determines the at least one second index corresponding to the second service, where each first index of the at least one first index is different from each second index of the at least one second index; the terminal device obtains a second data amount of the second service; the terminal device determines the fourth mapping relationship information according to the first mapping relationship information, the second mapping relationship information and the at least one second index, where the fourth mapping relationship information further includes a mapping relationship between the at least one second index and the second data amount. It should also be understood that in the embodiment of the present disclosure, when the at least one second index includes only one second index, the second address and the at least one second index may be the same, and the second address may also be different from each index of the at least one second index, that is, the terminal device may directly determine the second address as the at least one second index. Each second index of the at least one second index determined by the terminal device may also be different from the second address.

By means of that the terminal device reports the fourth mapping relationship and the first list to the network device, the network device can achieve the purpose of resource allocation to the terminal device. Specifically, the network device can determine, according to the at least one first index, the first data amount corresponding to the at least one first index and the at least one first carrier corresponding to the first address. Therefore, in the embodiment of the present disclosure, there needs to be a certain relationship between the at least one first index and the first address, so that the network device can accurately correlate the first data amount corresponding to the at least one first index with the at least one first carrier corresponding to the first address, thereby allocating the resource to the terminal device.

In an embodiment, the terminal device generates an address list, where the address list includes the first address; and the terminal device determines the at least one first index according to an order of the first address in the address list. For example, the terminal device may determine one index according to the order of the first address in the address list, and determine the one index as the at least one first index. As another example, the terminal device determines a carrier list according to the order of the first address in the address list, where the carrier list includes a carrier corresponding to each address in the address list; the terminal device determines the at least one index according to an order of each first carrier of the at least one first carrier in the carrier list, and determines the at least one index as the at least one first index. Further, in the embodiment of the present disclosure, the terminal device sends the address list to the network device. It should be noted that, in the embodiment of the present disclosure, the terminal device may send to the network device in the form of the address list, or may sequentially send to the network device in an order of the address list, which is not specifically limited in the embodiment of the present disclosure.

In another embodiment, the terminal device may directly send the at least one first index to the network device.

The terminal device may determine an index corresponding to the first address as the at least one first index. In other words, the terminal device may directly generate fifth mapping relationship information, where the fifth mapping relationship information includes a mapping relationship between the first address and the at least one first index. Therefore, after receiving at least one first index sent by the terminal device, the network device may determine the first address according to the at least one first index and the fifth mapping relationship, and then determine a first list, that is, the at least one first carrier corresponding to the first address. In other words, in the embodiment of the present disclosure, the terminal device needs to report the fifth mapping relationship information to the network device. Therefore, when the network device needs to know a specific address, it may directly determine the first address corresponding to the at least one first index according to the fifth mapping relationship information and the at least one first index.

In another embodiment, when the at least one first index includes only one first index, the one first index may be a third address of the first service determined by an access layer of the terminal device. In this case, the network device may directly determine the first address corresponding to the at least one first index according to the third address.

It should be understood that, in the embodiment of the present disclosure, the implementation manner in which the terminal device sends information to the network device, the terminal device determines the at least one first index, the terminal device determines the first data amount corresponding to the at least one first index, and the terminal device determines the at least one first carrier corresponding to the at least one first index, is similar to the implementation manner in which the network device receives the information sent by the terminal device, the network device determines the at least one first index, the network device determines the first data amount corresponding to the at least one first index, and the network device determines the at least one first carrier corresponding to the at least one first index. To avoid repetition, details are not described herein again.

Figure 4:
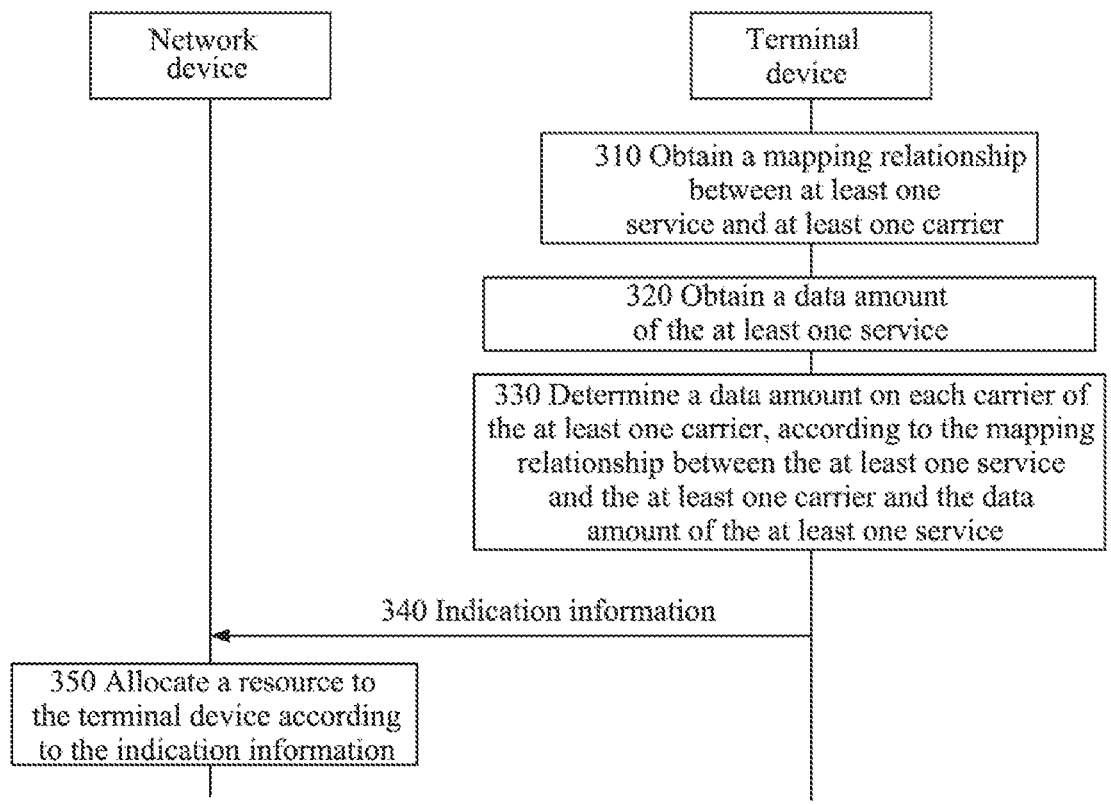
FIG. 4 is a schematic flowchart of a data amount reporting method according to an embodiment of the present disclosure.

FIG. 4 is a schematic diagram of another interaction method of a terminal device and a network device according to an embodiment of the present disclosure.

Specifically, as shown in FIG. 4, the method includes:

In step 310, the terminal device obtains a mapping relationship between at least one service and at least one carrier.

In step 320, the terminal device obtains a data amount of the at least one service.

In step 330, the terminal device determines a data amount on each carrier of the at least one carrier, according to the mapping relationship between the at least one service and the at least one carrier and the data amount of the at least one service.

In step 340, the terminal device sends indication information to a network device.

In step 350, the network device allocates a resource to the terminal device according to the indication information.

Here, the indication information is used to indicate the data amount on each carrier.

It can be seen that the network device may directly determine the data amount on each carrier according to the indication information, and then allocate the resource to the terminal device, which may directly avoid indicating the carrier and data amount corresponding to each address to the network device through address mapping. Furthermore, it is possible to avoid a situation where addresses conflict.

Figure 5:
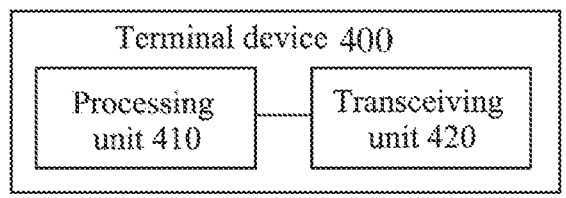
FIG. 5 is a schematic block diagram of a terminal device according to an embodiment of the present disclosure.

FIG. 5 is a schematic block diagram of a terminal device according to an embodiment of the present disclosure.

Specifically, as shown in FIG. 5, the terminal device 400 includes:

a processing unit 410, configured to:

obtain first mapping relationship information and second mapping relationship information, where the first mapping relationship information includes a mapping relationship between a first service and a first address, and the second mapping relationship information includes a mapping relationship between the first service and at least one first carrier;

determine a first index corresponding to the first service; and determine third mapping relationship information according to the first mapping relationship information, the second mapping relationship information and the first index, where the third mapping relationship information includes a mapping relationship between the first index and the at least one first carrier; and a transceiving unit 420, configured to send the third mapping relationship information to a network device.

In an embodiment, the processing unit 410 is further configured to:

obtain a first data amount of the first service; and determine fourth mapping relationship information according to the first mapping relationship information, the second mapping relationship information and the first index, where the fourth mapping relationship information includes a mapping relationship between the first index and the first data amount; and where the transceiving unit 420 is further configured to:

send the fourth mapping relationship information to the network device.

In an embodiment, the first address and the first index are different.

In an embodiment, the first mapping relationship information further includes a mapping relationship between a second service and a second address, and the second mapping relationship information further includes a mapping relationship between the second service and at least one second carrier;

the processing unit 410 is further configured to:

determine a second index corresponding to the second service, where the first index is different from the second index; and determine the third mapping relationship information according to the first mapping relationship information, the second mapping relationship information and the second index, where the third mapping relationship information further includes a mapping relationship between the second index and the at least one second carrier.

In an embodiment, the first address and the second address are different.

In an embodiment, the first address and the second address are the same.

In an embodiment, the second address and the second index are different.

In an embodiment, the second address and the second index are the same.

In an embodiment, the processing unit 410 is specifically configured to:

generate an address list, where the address list includes the first address, and determine an order of the first address in the address list as the first index.

In an embodiment, the address list further includes the second address, and an order of the second address in the address list is the second index corresponding to the second service.

In an embodiment, the transceiving unit 420 is further configured to: send the address list to the network device.

The processing unit 410 is specifically configured to:

determine an index corresponding to the first address as the first index.

In an embodiment, the processing unit 410 is further configured to generate fifth mapping relationship information, where the fifth mapping relationship information includes a mapping relationship between the first address and the first index; and the transceiving unit 420 is further configured to send the fifth mapping relationship information to the network device.

In an embodiment, the first index is a third address of the first service determined by an access layer of the terminal device.

In an embodiment, the transceiving unit 420 is further configured to: send the first index to the network device.

Figure 6:
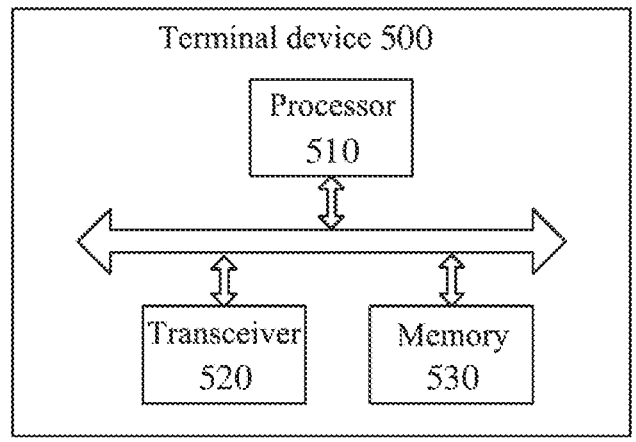
FIG. 6 is a schematic block diagram of another terminal device according to an embodiment of the present disclosure.

It should be noted that the processing unit 410 may be implemented by a processor, and the transceiving unit 420 may be implemented by a transceiver. As shown in FIG. 6, the terminal device 500 may include a processor 510, a transceiver 520 and a memory 530. The memory 530 may be used to store indication information, and may also be used to store codes, instructions, and the like executed by the processor 510. Various components in the terminal device 500 are connected through a bus system, where the bus system includes a power bus, a control bus and a status signal bus in addition to a data bus.

The terminal device 500 shown in FIG. 6 may implement the processes implemented by the terminal device in the above method embodiments shown in FIGS. 3 and 4. To avoid repetition, details are not described herein again.

Figure 7:
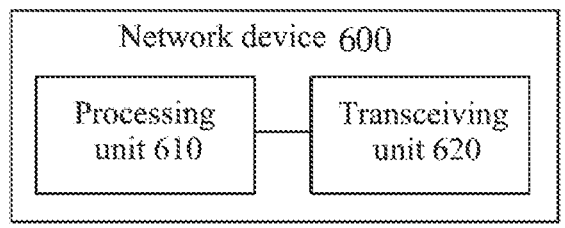
FIG. 7 is a schematic block diagram of a network device according to an embodiment of the present disclosure.

FIG. 7 is a schematic block diagram of a network device according to an embodiment of the present disclosure.

Specifically, as shown in FIG. 7, the network device 600 includes:

a processing unit 610, configured to determine a first index; and a transceiving unit 620, configured to receive third mapping relationship information sent by a terminal device, where the third mapping relationship information includes a mapping relationship between the first index and at least one first carrier;

where the processing unit 610 is further configured to:

determine the at least one first carrier corresponding to the first index according to the third mapping relationship information and the first index; and allocate a resource to the terminal device according to the at least one first carrier.

In an embodiment, the processing unit 610 is specifically configured to:

obtain fourth mapping relationship information, where the fourth mapping relationship information includes a mapping relationship between the first index and a first data amount; and allocate the resource to the terminal device according to the at least one first carrier and the first data amount.

In an embodiment, the first address and the first index are different.

In an embodiment, the third mapping relationship information further includes a mapping relationship between a second index and at least one second carrier, and the first index and the second index are different.

In an embodiment, the first address and a second address are different.

In an embodiment, the first address and a second address are the same.

In an embodiment, a second address and the second index are different.

In an embodiment, a second address and the second index are the same.

In an embodiment, the processing unit 610 is specifically configured to:

receive an address list sent by the terminal device; and determine an order of the first address in the address list as the first index.

In an embodiment, the address list further includes a second address, and an order of the second address in the address list is a second index corresponding to the second address.

In an embodiment, the transceiving unit 620 is further configured to: receive the first index sent by the terminal device.

In an embodiment, the first index is a third address determined by an access layer of the terminal device.

The transceiving unit 620 is further configured to:

receive fifth mapping relationship information sent by the terminal device, where the fifth mapping relationship information includes a mapping relationship between the first address and the first index; so that the network device determines the first address according to the fifth mapping relationship information and the first index.

Figure 8:
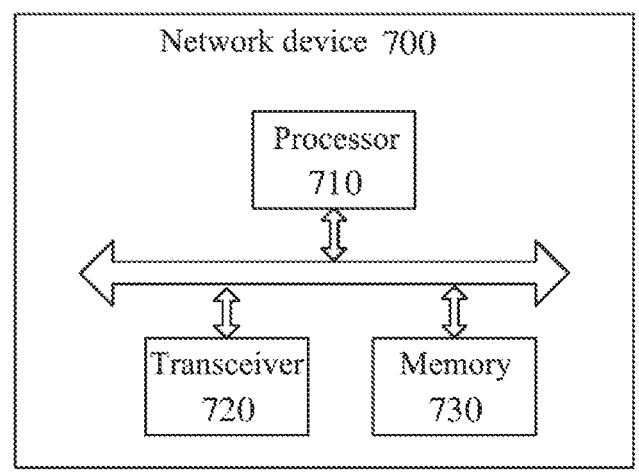
FIG. 8 is a schematic block diagram of another network device according to an embodiment of the present disclosure.

It should be noted that the processing unit 610 may be implemented by a processor, and the transceiving unit 620 may be implemented by a transceiver. As shown in FIG. 8, the network device 700 may include a processor 710, a transceiver 720, and a memory 730. The memory 730 may be used to store indication information, and may also be used to store codes, instructions, and the like executed by the processor 710. Various components in the network device 700 are connected through a bus system, where the bus system includes a power bus, a control bus and a status signal bus in addition to a data bus.

The network device 700 shown in FIG. 8 may implement the processes implemented by the network device in the above method embodiments shown in FIGS. 3 and 4. To avoid repetition, details are not described herein again.

In the embodiments of the present disclosure, a terminal device and a network device are also provided.

Specifically, the terminal device includes:

a processing unit, configured to: obtain first mapping relationship information and second mapping relationship information, where the first mapping relationship information includes a mapping relationship between a first service and a first address, and the second mapping relationship information includes a mapping relationship between the first service and at least one first carrier; determine at least one first index corresponding to the first service; obtain a first data amount of the first service; and determine fourth mapping relationship information according to the first mapping relationship information, the second mapping relationship information and the at least one first index, where the fourth mapping relationship information includes a mapping relationship between the at least one first index and the first data amount; and a transceiving unit, configured to send the fourth mapping relationship information to a network device.

In an embodiment, the processing unit is further configured to:

determine a first list according to the first mapping relationship information and the second mapping relationship information, where the first list includes the at least one first carrier corresponding to the first address; and the transceiving unit is further configured to send the first list to the network device.

In an embodiment, the first address is different from each first index of the at least one first index.

In an embodiment, the first mapping relationship information further includes a mapping relationship between a second service and a second address, and the second mapping relationship information further includes a mapping relationship between the second service and at least one second carrier; and the processing unit is further configured to:

determine at least one second index corresponding to the second service, where each first index of the at least one first index is different from each second index of the at least one second index; obtain a second data amount of the second service; and determine the fourth mapping relationship information according to the first mapping relationship information, the second mapping relationship information and the at least one second index, where in the fourth mapping relationship information further includes a mapping relationship between the at least one second index and the second data amount.

In an embodiment, the first address and the second address are different.

In an embodiment, the first address and the second address are the same.

In an embodiment, the second address is different from each second index of the at least one second index.

In an embodiment, the at least one second index includes only one second index, and the second address and the one second index are the same.

In an embodiment, the processing unit is specifically configured to: generate an address list, where the address list includes the first address; and determine the at least one first index according to an order of the first address in the address list.

In an embodiment, the processing unit is further specifically configured to: determine one index according to the order of the first address in the address list, and determine the one index as the at least one first index.

In an embodiment, the first address corresponds to at least one first carrier; and the processing unit is further specifically configured to: determine a carrier list according to the order of the first address in the address list, where the carrier list includes a carrier corresponding to each address in the address list; and determine at least one index according to an order of each first carrier of the at least one first carrier in the carrier list, and determine the at least one index as the at least one first index.

In an embodiment, the transceiving unit is further configured to: send the address list to the network device.

In an embodiment, the processing unit is specifically configured to: determine an index corresponding to the first address as the at least one first index.

In an embodiment, the processing unit is further specifically configured to:

generate fifth mapping relationship information, where the fifth mapping relationship information includes a mapping relationship between the first address and the at least one first index; and the transceiving unit is further configured to send the fifth mapping relationship information to the network device.

In an embodiment, the at least one first index includes only one first index, and the one first index is a third address of the first service determined by an access layer of the terminal device.

In an embodiment, the transceiving unit is further configured to send the at least one first index to the network device.

Accordingly, the network device includes:

a processing unit, configured to determine at least one first index; and a transceiving unit, configured to receive fourth mapping relationship information sent by a terminal device, where the fourth mapping relationship information includes a mapping relationship between the at least one first index and a first data amount; and where the processing unit is further configured to allocate a resource to the terminal device according to the first data amount.

In an embodiment, the transceiving unit is further configured to: receive a first list sent by the terminal device, where the first list includes at least one first carrier corresponding to a first address; and the processing unit is specifically configured to:

allocate the resource to the terminal device according to the at least one first carrier and the first data amount.

In an embodiment, the first address is different from each first index of the at least one first index.

In an embodiment, the fourth mapping relationship information further includes a mapping relationship between at least one second index and a second data amount, and each first index of the at least one first index is different from each second index of the at least one second index.

In an embodiment, the first address and a second address are different.

In an embodiment, the first address and a second address are the same.

In an embodiment, a second address is different from each second index of the at least one second index.

In an embodiment, the at least one second index includes only one second index, and the second address and the one second index are the same.

In an embodiment, the transceiving unit is specifically configured to: receive an address list sent by the terminal device; and the processing unit is specifically configured to: determine the at least one first index according to an order of the first address in the address list.

In an embodiment, the processing unit is further specifically configured to: determine one index according to the order of the first address in the address list, and determine the one index as the at least one first index.

In an embodiment, the first address corresponds to at least one first carrier; and the processing unit is further specifically configured to:

determine a carrier list according to the order of the first address in the address list, where the carrier list includes a carrier corresponding to each address in the address list; and determine at least one index according to an order of each first carrier of the at least one first carrier in the carrier list, and determine the at least one index as the at least one first index.

In an embodiment, the processing unit is specifically configured to: receive the at least one first index sent by the terminal device.

In an embodiment, the at least one first index includes only one first index, and the one first index is a third address determined by an access layer of the terminal device.

In an embodiment, the transceiving unit is further configured to:

receive fifth mapping relationship information sent by the terminal device, where the fifth mapping relationship information includes a mapping relationship between the first address and the at least one first index; so that the processing unit determines the first address according to the fifth mapping relationship information and the at least one first index.

In the embodiments of the present disclosure, a terminal device and a network device are also provided.

Specifically, the terminal device includes:

a transceiving unit, configured to: obtain a mapping relationship between at least one service and at least one carrier; and obtain a data amount of the at least one service; and a processing unit, configured to determine a data amount on each carrier of the at least one carrier, according to the mapping relationship between the at least one service and the at least one carrier and the data amount of the at least one service; where the transceiving unit is further configured to send indication information to the network device, where the indication information is used to indicate the data amount on each carrier.

The network device includes:

a transceiving unit, configured to receive indication information sent by a terminal device, where the indication information is used to indicate a data amount on each carrier of at least one carrier; and a processing unit, configured to allocate a resource to the terminal device according to the indication information.

It should be noted that the transceiving unit in the terminal device and the network device may be implemented by a transceiver, and the processing unit may be implemented by a processor. That is, the method embodiments in the embodiments of the present disclosure may be applied to a processor, or implemented by a processor.

In the implementation process, each step of the method embodiments in the embodiments of the present disclosure may be completed by using an integrated logic circuit of hardware or an instruction in the form of software in the processor. More specifically, the steps of the method disclosed in combination with the embodiments of the present disclosure may be directly implemented by a hardware decoding processor, or may be performed by a combination of hardware and software modules in the decoding processor. The software module may be located in a mature storage medium in the art such as a random access memory, a flash memory, a read-only memory, a programmable read-only memory, or an electrically erasable and programmable memory, a register, and the like. The storage medium is located in a memory, and the processor reads the information in the memory and completes the steps of the above methods in combination with its hardware.

The processor may be an integrated circuit chip with signal processing capabilities, and may implement or execute the methods, steps, and logic block diagrams disclosed in the embodiments of the present disclosure. For example, the above processor may be a general-purpose processor, a digital signal processor (DSP), an application specific integrated circuit (ASIC), a field programmable gate array (FPGA), or other programmable logic devices, transistor logic devices, discrete hardware components, and the like. In addition, the general-purpose processor may be a microprocessor or the processor may be any conventional processor, and the like.

In addition, in the embodiment of the present disclosure, the memory may be a volatile memory or a non-volatile memory, or may include both volatile and non-volatile memories. The non-volatile memory may be a read-only memory (ROM), a programmable read-only memory (PROM), an erasable programmable read-only memory (erasable PROM, EPROM), or an electrically erasable programmable read-only memory (electrically EPROM, EEPROM) or a flash memory. The volatile memory may be a random access memory (RAM), which is used as an external cache. It should be understood that the above memory is exemplary but not restrictive. For example, the memory in the embodiment of the present disclosure may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM) and a direct rambus random access memory (Direct Rambus RAM, DR RAM), and the like. That is, the memory of the systems and methods described herein is intended to include, but is not limited to, these and any other suitable types of memory.

Finally, it should be noted that the term used in the embodiments of the present disclosure and the appended claims is for the purpose of describing particular embodiments only and is not intended to limit the embodiments of the present disclosure.

For example, the singular forms "a," "the," and "the" used in the embodiments of the present disclosure and the appended claims are intended to include the plural forms as well, unless the context clearly indicates otherwise.

For another example, depending on the context, the word "when" as used herein may be interpreted as "if" or "if" or "when" or "responding to determination of" or "responding to detection of". Similarly, depending on the context, the phrase "if it is determined" or "if it is detected (the stated condition or event)" may be interpreted as "when it is determined" or "responding to determination of" or "when it is detected (the stated condition or event)" or "responding to detection of (the stated condition or event)".

Those of ordinary skill in the art may realize that the units and algorithm steps of each example described in combination with the embodiments disclosed herein may be implemented by electronic hardware, or a combination of computer software and electronic hardware. Whether these functions are performed in hardware or software depends on the specific application and design constraints of the technical solution. Professional technicians may use different methods to implement the described functions for each specific application, but such implementation should not be considered to be beyond the scope of the embodiments of the present disclosure.

Those skilled in the art can clearly understand that, for the convenience and brevity of description, the specific working processes of the systems, apparatuses, and units described above may refer to the corresponding processes in the above method embodiments, and are not repeated here.

In the several embodiments provided in the present application, it should be understood that the disclosed systems, apparatuses, and methods may be implemented in other ways. For example, the apparatus embodiments described above are only exemplary. For example, the division of the unit is only a logical function division. In actual implementation, there may be another division manner. For example, multiple units or components may be combined, or may be integrated into another system, or some features may be ignored or not implemented. In addition, the displayed or discussed mutual coupling or direct coupling or communication connection may be indirect coupling or communication connection through some interfaces, apparatuses or units, which may be electrical, mechanical or other forms.

The units described as separate components may or may not be physically separated, and the components displayed as units may or may not be physical units, may be located in one place, or may be distributed on multiple network units. Some or all of the units may be selected according to actual needs to achieve the objectives of the embodiments of the present disclosure.

In addition, the functional units in the embodiments of the present disclosure may be integrated into one processing unit, or each of the units may exist separately physically, or two or more units may be integrated into one unit.

If it is implemented in the form of a software functional unit and sold or used as an independent product, it may be stored in a computer-readable storage medium. Based on this understanding, the technical solutions of the embodiments of the present disclosure essential or a part thereof that contributes to the prior art or a part of the technical solutions may be embodied in the form of a software product, which is stored in a storage medium, including a plurality of instructions for causing a computer device (which may be a personal computer, a server, or a network device, and the like) to perform all or part of the steps of the methods described in the embodiments of the present disclosure. The above storage medium includes various media that may store program codes, such as a U disk, a mobile hard disk, a read-only memory, a random access memory, a magnetic disk, or an optical disk.

The above contents are only specific implementations of the embodiments of the present disclosure, but the protection scope of the embodiments of the present disclosure is not limited to this. Any person skilled in the art, based on the technical scope disclosed in the embodiments of the present disclosure, may easily think of that changes or replacements should be covered within the protection scope of the embodiments of the present disclosure. Therefore, the protection scope of the embodiments of the present disclosure shall be subject to the protection scope of the claims.

What is claimed is:

1. An information transmission method, comprising:
obtaining, by a terminal device, first mapping relationship information and second mapping relationship information, wherein the first mapping relationship information comprises a mapping relationship between a first service and a first address and a mapping relationship between a second service and a second address, and the second mapping relationship information comprises a mapping relationship between the first service and at least one first carrier and a mapping relationship between the second service and at least one second carrier;

determining, by the terminal device, a first index corresponding to the first service and a second index corresponding to the second service, wherein the first index is different from the second index;

determining, by the terminal device, third mapping relationship information according to the first mapping relationship information, the second mapping relationship information, the first index and the second index, wherein the third mapping relationship information comprises a mapping relationship between the first index and the at least one first carrier and a mapping relationship between the second index and the at least one second carrier; and sending, by the terminal device, the third mapping relationship information to a network device.

2. The method according to claim 1, further comprising:

obtaining, by the terminal device, a first data amount of the first service;

determining, by the terminal device, fourth mapping relationship information according to the first mapping relationship information, the second mapping relationship information and the first index, wherein the fourth mapping relationship information comprises a mapping relationship between the first index and the first data amount; and sending, by the terminal device, the fourth mapping relationship information to the network device;

wherein the first address and the first index are different.

3. The method according to claim 1, wherein the first address, the second address and the second index are configured in at least one of the following ways:

the first address and the second address are different or the same; and the second address and the second index are different or the same.

4. The method according to claim 3, wherein the determining, by the terminal device, the first index corresponding to the first service comprises:

generating, by the terminal device, an address list, wherein the address list comprises the first address; and determining, by the terminal device, an order of the first address in the address list as the first index;

wherein the address list further comprises the second address, and an order of the second address in the address list is the second index corresponding to the second service; and wherein the method further comprises:

sending, by the terminal device, the address list to the network device.

5. The method according to claim 1, wherein the determining, by the terminal device, the first index corresponding to the first service comprises:

determining, by the terminal device, an index corresponding to the first address as the first index;

wherein the method further comprises:

generating, by the terminal device, fifth mapping relationship information, wherein the fifth mapping relationship information comprises a mapping relationship between the first address and the first index; and sending, by the terminal device, the fifth mapping relationship information to the network device.

6. The method according to claim 1, wherein the first index is a third address of the first service determined by an access layer of the terminal device.

7. The method according to claim 5, further comprising:

sending, by the terminal device, the first index to the network device.

8. A terminal device, comprising:

a processor, configured to:

obtain first mapping relationship information and second mapping relationship information, wherein the first mapping relationship information comprises a mapping relationship between a first service and a first address and a mapping relationship between a second service and a second address, and the second mapping relationship information comprises a mapping relationship between the first service and at least one first carrier and a mapping relationship between the second service and at least one second carrier;

determine a first index corresponding to the first service and a second index corresponding to the second service, wherein the first index is different from the second index; and determine third mapping relationship information according to the first mapping relationship information, the second mapping relationship information, the first index and the second index, wherein the third mapping relationship information comprises a mapping relationship between the first index and the at least one first carrier and a mapping relationship between the second index and the at least one second carrier; and a transceiver, configured to send the third mapping relationship information to a network device.

9. The terminal device according to claim 8, wherein the processor is further configured to:

obtain a first data amount of the first service; and determine fourth mapping relationship information according to the first mapping relationship information, the second mapping relationship information and the first index, wherein the fourth mapping relationship information comprises a mapping relationship between the first index and the first data amount; and wherein the transceiver is further configured to: send the fourth mapping relationship information to the network device; and wherein the first address and the first index are different.

10. The terminal device according to claim 8, wherein the first address, the second address and the second index are configured in at least one of the following ways:

the first address and the second address are different or the same; and the second address and the second index are different or the same.

11. The terminal device according to claim 10, wherein the processor is specifically configured to:

generate an address list, wherein the address list comprises the first address; and determine an order of the first address in the address list as the first index;

wherein the address list comprises the second address, and an order of the second address in the address list is the second index corresponding to the second service; and wherein the transceiver is further configured to:

send the address list to the network device.

12. The terminal device according to claim 8, wherein the processor is specifically configured to:

determine an index corresponding to the first address as the first index;

wherein the processor is further configured to generate fifth mapping relationship information, wherein the fifth mapping relationship information comprises a mapping relationship between the first address and the first index; and the transceiver is further configured to send the fifth mapping relationship information to the network device.

13. The terminal device according to claim 8, wherein the first index is a third address of the first service determined by an access layer of the terminal device.

14. The terminal device according to claim 12, wherein the transceiver is further configured to:
send the first index to the network device.

15. A network device, comprising:
a processor, configured to determine a first index and a second index; and
a transceiver, configured to receive third mapping relationship information sent by a terminal device, wherein the third mapping relationship information comprises a mapping relationship between the first index and at least one first carrier and a mapping relationship between the second index and at least one second carrier;
wherein the processor is further configured to:
determine the at least one first carrier corresponding to the first index according to the third mapping relationship information and the first index;
determine the at least one second carrier corresponding to the second index according to the third mapping relationship information and the second index; and
allocate a resource to the terminal device according to the at least one first carrier and the at least one second carrier.

16. The network device according to claim 15, wherein the processor is specifically configured to:
obtain fourth mapping relationship information, wherein the fourth mapping relationship information comprises a mapping relationship between the first index and a first data amount; and
allocate the resource to the terminal device according to the at least one first carrier and the first data amount;
wherein the first address and the first index are different.

17. The network device according to claim 15, wherein the first address, a second address and the second index are configured in at least one of the following ways:
the first address and the second address are different or the same; and
the second address and the second index are different or the same.

18. The network device according to claim 15, wherein the processor is specifically configured to:
receive an address list sent by the terminal device; and
determine an order of the first address in the address list as the first index;
wherein the address list further comprises a second address, and an order of the second address in the address list is a second index corresponding to the second address.

19. The network device according to claim 15, wherein the transceiver is further configured to:
receive the first index sent by the terminal device;
wherein the first index is a third address determined by an access layer of the terminal device; and
wherein the transceiver is further configured to:
receive fifth mapping relationship information sent by the terminal device, wherein the fifth mapping relationship information comprises a mapping relationship between the first address and the first index; so that the network device determines the first address according to the fifth mapping relationship information and the first index.

* * * * *